US009566961B2

(12) United States Patent
Hesseler et al.

(10) Patent No.: US 9,566,961 B2
(45) Date of Patent: Feb. 14, 2017

(54) METHOD FOR OPERATING A BRAKING APPARATUS WITH A SERVICE AND PARKING BRAKE FUNCTION

(71) Applicant: Ford Global Technologies, Dearborn, MI (US)

(72) Inventors: Karl-Peter Hesseler, Lohmar-Donrath (DE); Mike John Mould, Leverkusen (DE); Chad Michael Korte, Gross Ile, MI (US); Nadja Wysietzki, Cologne (DE)

(73) Assignee: Ford Global Technologies, Dearborn, MI (US)

( * ) Notice: Subject to any disclaimer, the term of this patent is extended or adjusted under 35 U.S.C. 154(b) by 45 days.

(21) Appl. No.: 14/598,155

(22) Filed: Jan. 15, 2015

(65) Prior Publication Data
US 2015/0197224 A1 Jul. 16, 2015

(30) Foreign Application Priority Data

Jan. 15, 2014 (DE) ........................ 10 2014 200 602

(51) Int. Cl.
*G06F 7/70* (2006.01)
*B60T 8/17* (2006.01)
*B60T 8/88* (2006.01)
(52) U.S. Cl.
CPC ................. *B60T 8/17* (2013.01); *B60T 8/885* (2013.01); *B60T 2270/402* (2013.01)

(58) Field of Classification Search
CPC ........ B60T 8/17; B60T 8/885; B60T 2270/402
See application file for complete search history.

(56) References Cited

U.S. PATENT DOCUMENTS 6,019,436 A * 2/2000 Siepker ..................... B60T 7/12
188/106 F
2013/0184954 A1 * 7/2013 Treppenhauer ......... B60T 7/122
701/70

FOREIGN PATENT DOCUMENTS

EP 0825081 B1 3/2002
WO WO 2012/038498 A1 3/2012

* cited by examiner

*Primary Examiner* — Ian Jen
(74) *Attorney, Agent, or Firm* — Angela M. Brunetti; Raymond Coppiellie

(57) ABSTRACT

A method for operating a braking apparatus with a service and parking brake function, which braking apparatus can be applied both in a hydraulic manner by means of a hydraulic pressure generator and by means of an electromechanical force generator. A transfer takes place from the pressure generator, which exerts the hydraulic brake application, to the force generator, which exerts the electromechanical brake application, as soon as the braking torque is active at the braking apparatus. During the transfer, the braking torque, which is applied by the hydraulic pressure generator and the braking torque which is applied by the electromechanical force generator, is at least as high as the braking torque applied solely by the hydraulic pressure generator before the transfer.

15 Claims, 2 Drawing Sheets

METHOD FOR OPERATING A BRAKING APPARATUS WITH A SERVICE AND PARKING BRAKE FUNCTION

CROSS-REFERENCE TO RELATED APPLICATIONS

This application claims priority to DE Application No. 10 2014 200602.3, filed Jan. 15, 2014, the disclosure of which is incorporated, in its entirety, by reference herein.

TECHNICAL FIELD

The inventive subject matter is directed to a method for operating a braking apparatus with a service and parking brake function.

BACKGROUND

Motor vehicles are usually equipped with service brakes and parking brakes which are independent of one another. The latter are often called "handbrake" or "park brake". In contrast to service brakes, parking brakes do not require further activation after the actuation. Rather, they serve predominantly to secure a parked vehicle against rolling away. Sometimes, a parking brake is designed in such a way that the vehicle may be brought to a standstill by way of the parking brake if the service brake fails. Dedicated actuating members for the parking brake are conventionally provided in motor vehicles, such as handbrake levers or foot levers which are coupled to dedicated brake application elements by way of control cables.

In the case of relatively modern parking brake systems, the actuation by way of muscular force is increasingly being replaced by an actuating unit, which may be automated, and is, as a rule, electromechanical. Here, tightening or releasing of the parking brake may be caused, for example, by way of a switch actuation or else automatically by way of an electronic control device. Thus, for example, the vehicle which is first of all held at a standstill by a hydraulically actuable service brake may be held solely by way of the automatically actuated electromechanical parking brake after a certain time, or if the vehicle driver leaves the vehicle.

A parking brake system for a vehicle, the friction brakes of which can be actuated both in a hydraulic manner by way of a hydraulic pressure generator and bypassing said hydraulic transfer directly by way of an electric motor force generator, is known. In this system, means stipulate the actuating type (hydraulic or electromechanical) and bring about a change between the two actuating types from case to case. A transfer from an actuating device which exerts the first actuating type to an actuating device which exerts the second actuating type takes place only when a braking force is built up in the actuating device which assumes the brake actuation, which braking force is at least as high as the braking force in the transferring actuating device.

Against this background, the present invention is based on the object of providing a method for operating a braking apparatus with a service and parking brake function and a motor vehicle, which make a transfer from a hydraulic actuating type to a purely electromechanical actuating type of the braking apparatus possible, which transfer is more rapid temporally than the currently known prior art; in addition, the load which acts on the braking apparatus is to be reduced.

SUMMARY

A method for operating a braking apparatus with a service and parking brake function, which braking apparatus can be applied both in a hydraulic manner by means of a hydraulic pressure generator and bypassing the hydraulic transfer by means of an electromechanical force generator. The hydraulic pressure generator and the electromechanical force generator act on a common brake application element, for example a brake piston. The electromechanical force generator acts by way of an actuating element, (for example a drive nut which is displaced by a spindle which is driven by means of an electric motor on the spindle in the axial direction of the spindle), on the brake application element. A transfer takes place from the pressure generator, which exerts the hydraulic brake application, to the force generator, which exerts the electromechanical brake application, as soon as the braking torque is active at the braking apparatus. During the transfer, the braking torque, which is applied by the hydraulic pressure generator and the braking torque which is applied by the electromechanical force generator, is at least as high as the braking torque applied solely by the hydraulic pressure generator before the transfer. Accordingly, in the inventive subject matter, the transfer already takes place at an earlier time than in the prior art, at which time the electromechanical force generator has not yet on its own built up the braking force which is applied solely by the hydraulic pressure generator before the transfer.

Both the hydraulic pressure generator and the electromechanical force generator act jointly on the brake application element Therefore, a sufficient brake application of the braking apparatus is ensured at the transfer time. The brake application element, for example the brake piston, can already be held in its position shortly after the contact by way of the actuating element, for example the drive nut, of the electromechanical force generator. The braking torque, which is active at the braking apparatus and results from the sum of the braking torque which is applied by the hydraulic pressure generator and the braking torque which is applied by the electromechanical force generator, is accordingly at least as high during the transfer as the braking torque which is applied solely by the hydraulic pressure generator before the transfer. The method according to the inventive subject matter therefore makes it possible to bring the transfer time as far forward as possible and accordingly shortens the transfer duration in comparison with known methods. In addition, the overall load on the braking apparatus during the transfer is reduced, since the hydraulic pressure of the hydraulic pressure generator can be dissipated, while the actuating element of the electromechanical force generator is driven against the brake application element.

After the transfer front the pressure generator, which exerts the hydraulic brake application, to the force generator, which exerts the electromechanical brake application, the hydraulic pressure generator is switched to be completely pressureless. This has the advantage that monitoring of the hydraulic pressure generator, for example during a standstill of the vehicle, does not have to be carried out, as would otherwise be the case due to the re-tightening, of the hydraulic pressure generator from time to time on account of unavoidable leakage losses in the hydraulic brake circuit.

Elements and steps in the figures are illustrated for simplicity and clarity and have not necessarily been rendered according to any particular sequence. For example, steps that may be performed concurrently or in different order are illustrated in the figures to help to improve understanding of embodiments of the inventive subject matter.

DESCRIPTION OF INVENTION

While various aspects of the inventive subject matter are described with reference to a particular illustrative embodiment, the invention is not limited to such embodiments, and additional modifications, applications, and embodiments may be implemented without departing from the inventive subject matter. In the figures, like reference numbers will be used to illustrate the same components. Those skilled in the art will recognize that the various components set forth herein may be altered without varying from the scope of the inventive subject matter.

Figure 1:
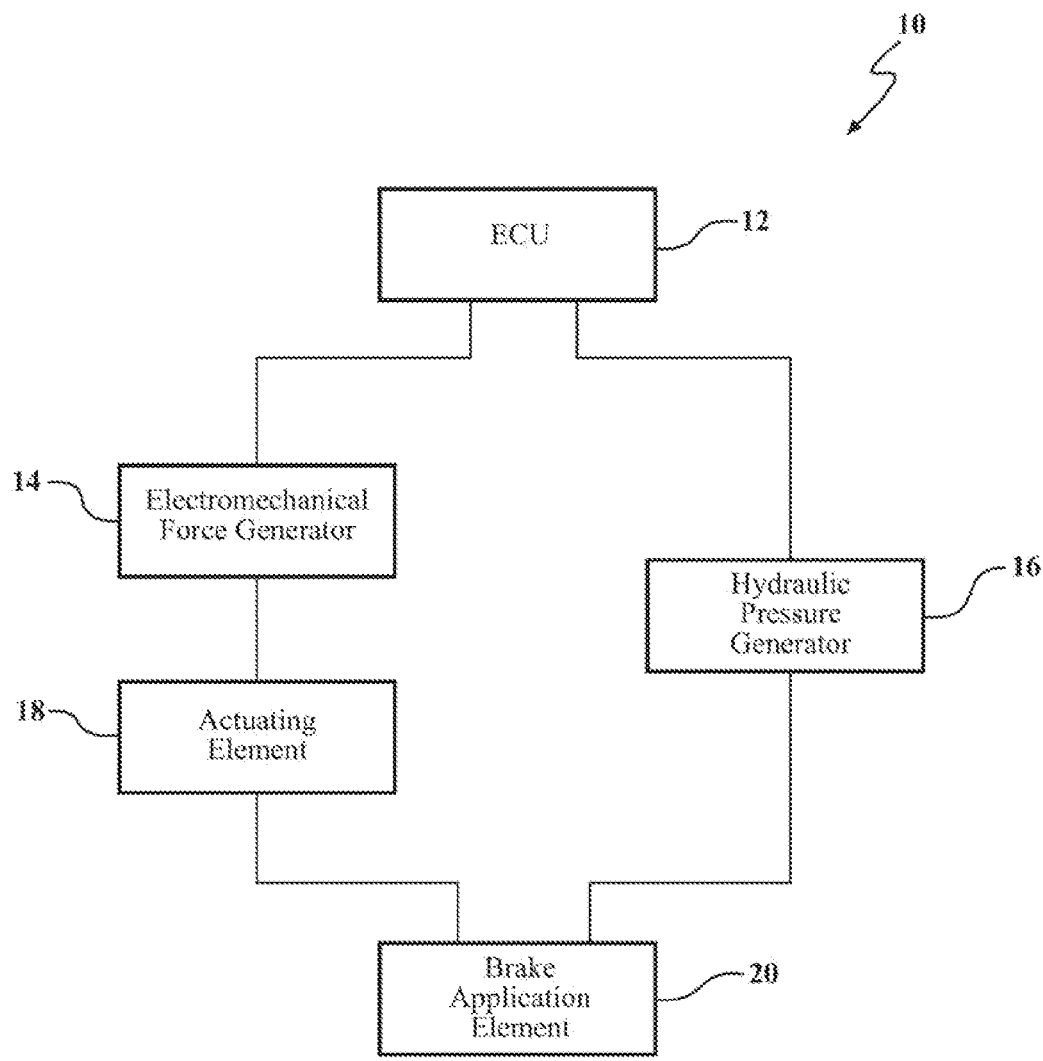
FIG. 1 is a block diagram of a brake system for having a hydraulically actuated service brake and an electromechanical actuated parking brake.

FIG. 1 shows a braking apparatus 10 applied both in a hydraulic manner by means of a hydraulic pressure generator 16 and, bypassing the hydraulic transfer, by means of an electromechanical force generator 14. The hydraulic pressure generator 16 and the electromechanical force generator 14 act on a common brake application element 20, in particular a brake piston, and the electromechanical force generator 14 acts on the brake application element 20 via an actuating element 18, in particular a drive nut which is displaced by a spindle which is driven by means of art electric motor which is assigned to the electromechanical force generator on the spindle in the axial direction of the spindle. An electronic control unit 12 controls the generators 14, 16.

Figure 2:
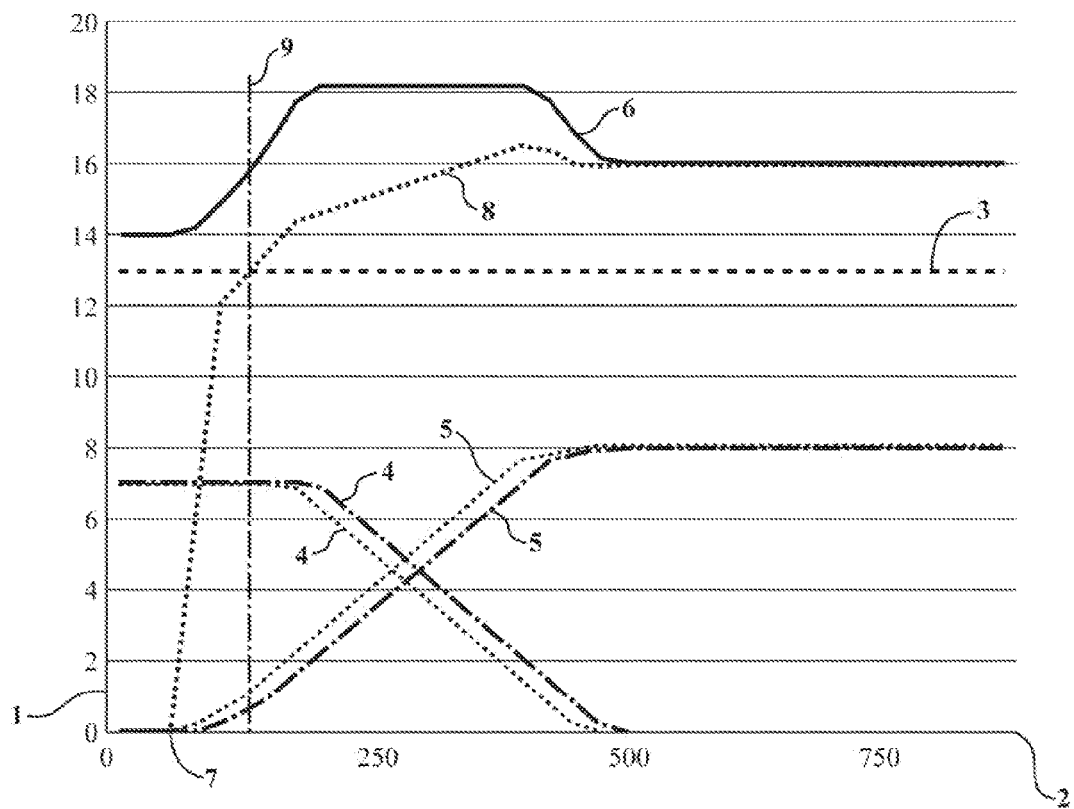
FIG. 2 is a graph of the braking force applied during a transfer from a hydraulic actuated type of the service brake to an electromechanical actuated type of the parking brake.

FIG. 2 is a graph of several plots. The ordinate, 1, represents a braking force in kN which is active at braking apparatus 10 with a service and parking brake function of a motor vehicle, and the abscissa 2 of which represents the time in ms.

A straight plot 3 which is shown in FIG. 2 represents the required overall braking force, in order for it to be possible to hold the motor vehicle, in which the braking apparatus is installed, at a standstill. The temporal course of a braking force which is applied by a hydraulic pressure generator of the braking apparatus is shown by a plot 4, both the course of the braking force of the hydraulic pressure generator on a right-hand side of the vehicle and the course of the braking force of the hydraulic pressure generator on a left-hand side of the vehicle being plotted in FIG. 2. The temporal course of a braking force which is applied by an electromechanical force generator of the braking apparatus is shown by a plot 5, both the braking force course of an electromechanical force generator which is active on the right-hand vehicle side and an electromechanical force generator which is active on the left-hand vehicle side being plotted in FIG. 2.

Furthermore, a plot 6 in FIG. 2 represents the overall sum of the hydraulically applied braking forces of the hydraulic pressure generator 16 and the electromechanically applied braking forces of the electromechanical force generator 14, that is to say the sum of both plots 4 and plot 5. A time, at which the actuating element 18 of the electromechanical force generator 14 comes into contact with the brake application element 20, is shown at 7.

By means of the plots 4, 5 and 6, a transfer from the pressure generator 16 which exerts the hydraulic brake application to the force generator 14 which exerts the electromechanical brake application will now be explained. As can be seen in FIG. 2 using the time courses of the plots 4 and 6 from left to right, the braking force 3 which is required to hold the vehicle at a standstill is first of all, that is to say before the time 7 is reached, applied solely by the hydraulic pressure generator 16 (that is to say, the plot 6 runs slightly above the plot 3), the pressure of which is controlled, for example, by an electronic control unit 12 of an electronic stability program (ESP) of the vehicle. Accordingly, the brake application element 20, on which the hydraulic pressure generator 16 acts, is held in its brake application position solely by the hydraulic pressure generator 16. The actuating element 18 of the electromechanical force generator 14 is not in contact with the brake application element 20 in this state.

For the transfer from the pressure generator 16 which exerts the hydraulic brake application to the force generator 14 which exerts the electromechanical brake application, the electromechanical force generator 14 is now actuated, in particular the actuating element 18 is moved toward the brake application element 20. At the time 7, the actuating element 18 of the electromechanical force generator 14 comes into contact with the brake application element 20. At this time, the hydraulic pressure cannot yet be dissipated on account of what is known as the "settling effect" of the actuating element 18. If the hydraulic pressure were dissipated at the time 7, there would be a certain decrease in the brake application force (up to 20% decrease) on account of the loading of the actuating element, such as the drive nut on the spindle. This situation is shown by a plot 8 in FIG. 2 which represents the entire braking force which is applied by the electromechanical force generator 14 if the hydraulic pressure of the hydraulic pressure generator 16 were dissipated at this time. It can be gathered from the plot 8 that, according to the present invention, the dissipation of the hydraulic pressure does not begin before a time 9 when the overall braking force which is applied by the electromechanical force generator 14 corresponds at least to the required braking force 3 if the hydraulic pressure of the hydraulic pressure generator 16 were dissipated immediately after the actuating element 18 comes into contact with the brake application element 20.

After the time 9 is reached, the brake application element 20 can also be held in the brake application position by the electromechanical force generator 14. Accordingly, in the exemplary embodiment (shown in FIG. 2) of the method according to the invention, the hydraulic pressure generator 16 is switched to pressureless shortly after the time 9, which is represented correspondingly by the falling plots 4 after the time 9 is passed. At the same time, the braking torque which is applied by the electromechanical force generator 14 increases, which is indicated in FIG. 2 by way of the plots 5 which rise after the time 7. During the transfer, the braking force which is active at the braking apparatus 10 is composed of the braking force which is applied by the hydraulic pressure generator 16 and the braking force which is applied by the electromechanical force generator 14, which braking forces, when added together, always reach at least the required braking force 3. After the transfer from the hydraulic pressure generator 16 to the electromechanical force generator 14 has been carried out, the resulting braking force which is applied by the electromechanical force generator 14 is slightly greater than the braking force which is applied solely by the hydraulic pressure generator 16 before the transfer, which is likewise illustrated in FIG. 2.

The present invention therefore makes it possible to bring the transfer time forward as far as possible and accordingly to shorten the transfer duration in comparison with known methods. In addition, the overall loading on the braking apparatus 10 during the transfer is reduced, since the hydraulic pressure of the hydraulic pressure generator 16 can be dissipated while the actuating element 18 of the electromechanical force generator 14 is driven against the brake application element 20.

As discussed above, after the transfer from the pressure generator, the hydraulic pressure generator 16 is switched to be completely pressureless. This has the advantage that monitoring of the hydraulic pressure generator 16, for example during a standstill of the vehicle, does not have to be carried out, as would otherwise be the case due to the re-tightening of the hydraulic pressure generator 16 from time to time on account of unavoidable leakage losses in the hydraulic brake circuit.

The transfer time for the transfer from the pressure generator 16 which exerts the hydraulic brake application to the force generator 14 which exerts the electromechanical brake application can be determined using the power consumption of the electromechanical force generator 14, which power consumption changes, in particular rises, in the case of contact between the actuating element 18 and the brake application element 20. This simplifies the construction of the braking apparatus 10, since no additional sensors for detecting the contact between the brake application element 20 and the actuating element 18 of the electromechanical force generator 14 have to be provided.

The hydraulic pressure of the hydraulic pressure generator 16 is dissipated during the transfer as a function of the power consumption of the electromechanical force generator 14, and the greater the power consumption the greater the hydraulic pressure dissipation. The power consumption of the electromechanical force generator 14 is an indicator of the braking force which is exerted on the braking apparatus 10 by the electromechanical force generator 14. It can thus be ensured merely by way of monitoring the power consumption of the electromechanical force generator 14 at every time during the transfer that the braking torque active on the braking apparatus 10 during the transfer (which is composed of the braking torque applied by the hydraulic pressure generator 16 and the braking torque applied by the electromechanical force generator 14) is at least as great as the braking torque applied solely by the hydraulic pressure generator 16 before the transfer.

In the method according to the invention which is shown in FIG. 2, the time 7 and/or the time 9 are determined by way of the power which is consumed by the electromechanical force generator. As soon as the actuating element 18 comes into contact with the brake application element 20 and after the settling effect has been equalized, the force expenditure upon further actuation of the electromechanical force generator 14 and therefore the power which is required by the latter rise considerably, with the result that the contact time can be determined by way of the changing power consumption of the electromechanical force generator 14. Additional sensors for detecting the contact between the actuating element 18 and the brake application element 20 can therefore be dispensed with.

In the foregoing specification, the invention has been described with reference to specific exemplary embodiments. Various modifications and changes may be made, however, without departing from the scope of the inventive subject, matter as set forth in the claims. The specification and figures are illustrative, rather than restrictive, and modifications are intended to be included within the scope of the inventive subject matter. Accordingly, the scope of the invention should be determined by the claims and their legal equivalents rather than by merely the examples described.

For example, the steps recited in any method or process claims may be executed in any order and are not limited to the specific order presented in the claims. The equations may be implemented with a filter to minimize effects of signal noises. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the inventive subject matter, in addition to those not specifically recited, may be varied or otherwise particularly adapted to specific environments, manufacturing specifications, design parameters or other operating requirements without departing from the general principles of the same.

The invention claimed is:

1. A method for operating a braking apparatus carried out by an electronic control unit, the method comprising the steps of:
   applying braking force to a brake application element by way of a hydraulic pressure generator;
   applying braking force to the brake application element by way of an electromechanical force generator acting on an actuating element of the brake application element, wherein the braking force applied at the brake application element is composed of the braking force applied by the hydraulic pressure generator and brake force applied by the electromechanical force generator; and
   determining, in the electronic control unit, that the brake force applied by the electromechanical force generator alone is at least as high as the brake force applied solely by the hydraulic pressure generator; and
   transferring the application of brake force from the hydraulic pressure generator to the electromechanical force generator as soon as the determination is made that the brake force applied by the electromechanical force generator alone is at least as high as the brake force applied solely by the hydraulic pressure generator.

2. The method of claim 1 further comprising the step of switching the hydraulic pressure generator to be completely pressureless after the step of transferring takes place.

3. The method of claim 1 further comprising the step of determining a time for transferring the application of brake force from the hydraulic pressure generator to the electromechanical force generator using a power consumption of the electromechanical force generator, the power consumption changes upon contact between the actuating element and the brake application element.

4. The method as claimed in claim 1 wherein during the step of transferring further comprises dissipating hydraulic pressure of the hydraulic pressure generator.

5. The method as claimed in claim 4 wherein the step of dissipating further comprises dissipating the hydraulic pressure of the hydraulic pressure generator as a function of a power consumption of the electromechanical force generator.

6. The method as claimed in claim 5 wherein the greater the power consumption, the greater the dissipation of the hydraulic pressure.

7. A method for transferring brake force from a hydraulic pressure generator to an electromechanical force generator on a vehicle having an electronic control unit for controlling the generators, the method comprising the steps of:
controlling the hydraulic pressure generator to apply hydraulic pressure to a brake application element;
controlling the electromechanical force generator to apply a brake force to the brake application element by way of an actuating element, a brake force at the brake application element is composed of brake force from the hydraulic pressure generator and brake force from the electromechanical force generator;
controlling a transfer of application of brake force from the hydraulic pressure generator and the electromechanical force generator to only the electromechanical force generator as soon as the brake force at the brake application element is at least as high as the brake force applied solely by the hydraulic pressure generator prior to the step of controlling the transfer.

8. The method as claimed in claim 7 wherein, after the step of controlling the transfer, the method further comprises the step of switching the hydraulic pressure generator to be completely pressureless.

9. The method as claimed in claim 7 further comprising the step of determining a time for the transfer using a power consumption of the electromechanical force generator whose power consumption changes upon contact between the actuating element and the brake application element.

10. The method as claimed in claim 8 wherein the step of switching the hydraulic pressure generator to be completely pressureless further comprises dissipating the hydraulic pressure during the transfer as a function of the power consumption of the electromechanical force generator.

11. A braking system comprising:
an electronic control unit;
a brake application element;
a hydraulic pressure generator controlled by the electronic control unit to apply brake force to the brake application element;
an electromechanical force generator controlled by the electronic control unit to apply electromechanical brake force to an actuating element acting on the brake application element; and
the electronic control unit, upon detecting when the brake force acting on the brake application element applied by the electromechanical force generator is equal to the brake force applied by the hydraulic pressure generator, transfers the application of brake force to the electromechanical force generator only.

12. The system as claimed in claim 11 wherein a power consumption of the electromechanical force generator determines when to transfer the application of brake force.

13. The system as claimed in claim 11 wherein the brake force applied by the hydraulic pressure generator is dissipated.

14. The system as claimed in claim 13 wherein the brake force applied by the hydraulic pressure generator is dissipated after the transfer.

15. The system as claimed in claim 13 wherein the brake force applied by the hydraulic pressure generator is dissipated during the transfer and is a function of a power consumption of the electromechanical force generator.

* * * * *